United States Patent [19]

Tippmer

[11] 4,220,469
[45] Sep. 2, 1980

[54] METHOD FOR PRODUCING REDUCTION GASES CONSISTING ESSENTIALLY OF CARBON MONOXIDE AND HYDROGEN

[75] Inventor: Kurt Tippmer, Recklinghausen, Fed. Rep. of Germany

[73] Assignee: Firma Carl Still, Fed. Rep. of Germany

[21] Appl. No.: 931,129

[22] Filed: Aug. 4, 1978

[30] Foreign Application Priority Data

Aug. 6, 1977 [DE] Fed. Rep. of Germany ....... 2735565

[51] Int. Cl.² ............................................ C21B 13/00
[52] U.S. Cl. .......................................... 75/91; 75/34; 48/202
[58] Field of Search ................. 75/34, 35, 91; 48/202

[56] References Cited

U.S. PATENT DOCUMENTS

| 3,853,538 | 12/1974 | Nemeth | 75/35 |
| 4,066,420 | 1/1978 | Danguillier et al. | 48/202 |

*Primary Examiner*—M. J. Andrews
*Attorney, Agent, or Firm*—McGlew and Tuttle

[57] ABSTRACT

A single heat method of producing reduction gases which consist essentially of carbon monoxide and hydrogen for ore-reducing processes, comprises, directing a coal and water suspension into a reactor to generate combustion gases under pressure having a temperature in the range of from 1300° C. to 1500° C. and mixing the combustion gases immediately after they are formed with reduction furnace waste gases which have a temperature in the range of from 100° C. to 500° C. The mixed gases are then directed through a water seal separator to separate and quench slag particles and the slag particles are removed with water from the gas stream. The pressure gases are mixed with the waste gases in a proportion of from 1:0.5 to 1:2.0. The resultant gases after purification and hydrogen sulfide scrubbing are directed back into the ore-reducing process and the quenched slag particles are fused to larger size agglomerates and are carried out of the gas stream and taken up in water.

8 Claims, 1 Drawing Figure

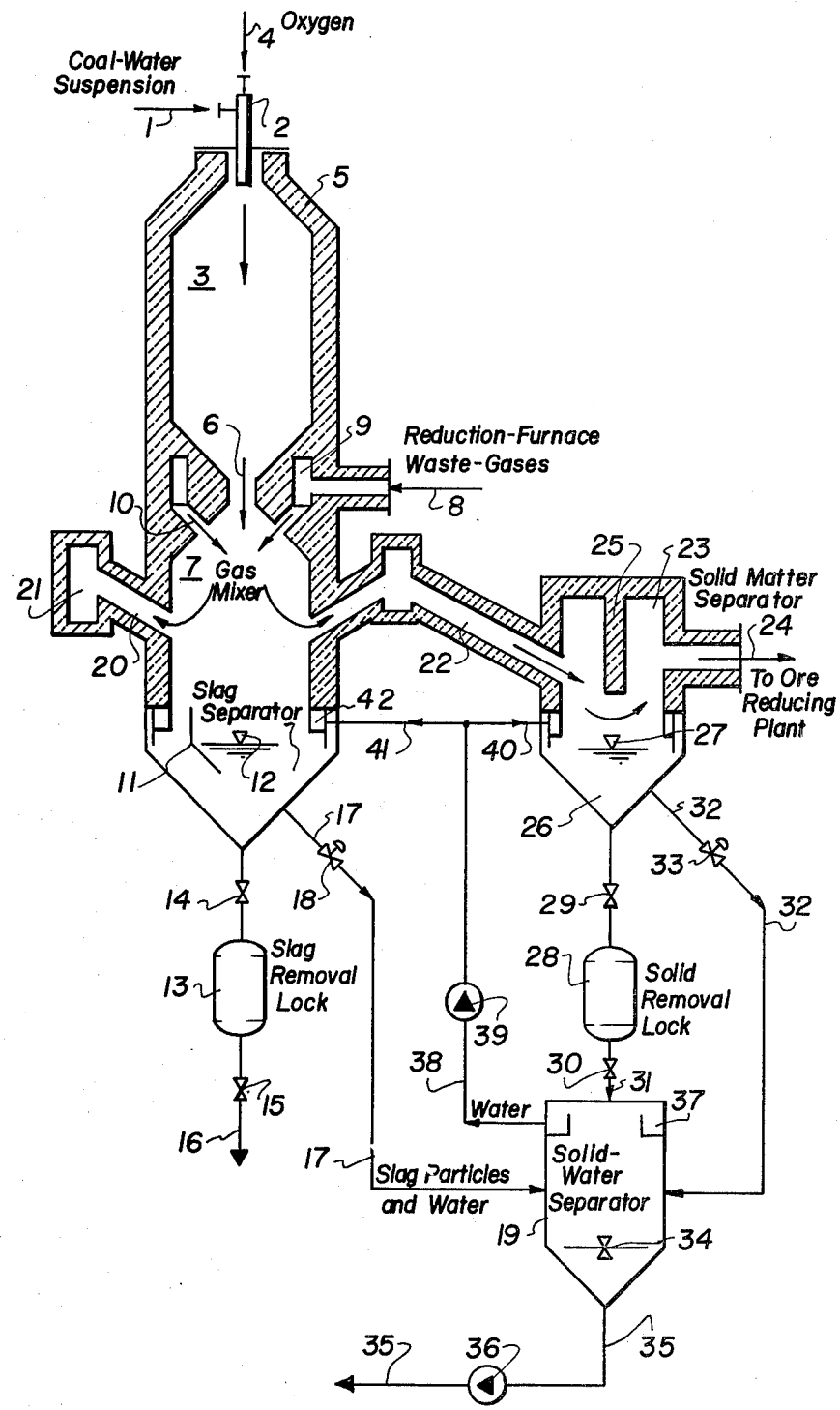

METHOD FOR PRODUCING REDUCTION GASES CONSISTING ESSENTIALLY OF CARBON MONOXIDE AND HYDROGEN

FIELD AND BACKGROUND OF THE INVENTION

This invention relates in general to a method and apparatus for producing reduction gases and, in particular, to a new and useful method and apparatus for producing reduction gases with a single heat process in which a suspension of coal and water is burned in a pressure reactor to form pressure gases which are mixed with waste gases from a reduction furnace having a much lower temperature.

DESCRIPTION OF THE PRIOR ART

The term single-heat method used in connection with the invention is to be understood as an indication that, while carrying out such a method to its full extent, heat is produced and applied during a single operational step, whereas, in all of the other operational steps, only heat is transferred.

A method is known from German OS No. 2,527,097, in which the fresh gas stream is first cooled and purified and is then united with the cooled and purified waste gas from the reaction process. Prior to introducing the gas mixture into the reduction reactor, it must be reheated to the ore-reduction temperature of from 800° C. to 1000° C. and, therefore, this is not a single-heat method.

The fact that slag obtained in a coal gasification is taken up by water is known, for example, from the review "Rohstoffwirtschaft International," Vol. 4 "Coal Gasification," by W. Peters, publisher Glückauf GmbH, Essen, 1976, pages 112 and 150. The considered substance reacted upon, however, is not an aqueous coal suspension, but lump coal, and the reaction is assumed to take place in a fixed bed reactor in the presence of steam and oxygen. In this connection, attention is also drawn to a compendious article by Flesch in the periodical "Glückauf" 90 (1954) p. 537.

It has also been proposed to force the hot gas produced by reacting an aqueous coal suspension with oxygen or oxygen-rich gases through water, in order to quench it, enrich it with steam, and then free it from slag particles.

In methods for producing reaction gases by a partial oxidation of coal with oxygen, the separation of slag is a particular problem. The coal gasification can be carried out at temperatures up to 1500° C. at which the ash particles, if not thoroughly liquefied, may be, or become, at least doughy or plastic. In such consistency, they are thrown against the inside surfaces of the gasification reactor or of the following apparatus where they settle to form an undesirable solid deposit and unduly hinder the passage and dissipation of heat. This may lead to considerable disturbances or interruptions in the operation and it may even be necessary to stop the plant, allow it to cool down, and to remove the solidified ash melt from the apparatus by wearisome manual work.

SUMMARY OF THE INVENTION

The present invention is directed to a method of producing reduction gases of carbon monoxide and hydrogen by a single heating process in which deposits of liquefied, doughy or plastic slag particles on the inside surfaces of the gasification reactor or the following apparatus are prevented.

For this purpose, it is provided that the stream of crude gas having a temperature of about from 1300° C. to 1500° C. is mixed immediately after the pressure gasification and in a proportion of from 1:0.5 to 1:2.0, with the waste gas coming from an ore-reducing process and having a temperature of from 100° C. to 150° C. The mixed gases are then dedusted and washed in a $H_2S$ scrubber and supplied into the ore-reducing process, while the quenched slag particles which are fused to larger-size agglomerates are carried out of the gas stream and taken up in water.

The deposition of slag on the apparatus walls is particularly efficiently prevented if the fresh gas is mixed with the purified waste gas from the ore-reduction in a proportion ranging between 1:0.5 and 1:2.0, such that, the mixed gas stream assumes a temperature of from 800° C. to 1000° C.

It has been found that a pressure between 5 and 10 bars is particularly suitable for carrying out the gasification. With high dust contents, it may be advisable to dedust or separate the circulating waste gas from the ore-reduction prior to admixing the fresh gas.

To carry out the inventive method, it is advantageous to provide a gas mixing stage or a gas mixer immediately downstream of the pressure gasification reactor.

The inventive method is carried out by equipment in which the hot fresh gas from a pressurized gasification reactor is discharged through a central hot gas nozzle provided at the bottom of the reactor into the gas mixer. The dedusted waste gas of the ore reduction, having a temperature of from 100° C. to 500° C., is admixed through an inner annular manifold and hot gas nozzles are arranged along the circumference of the mixer and extend at an acute angle relative to the central hot gas nozzle. The gas mixture is drawn off through gas outlets which are also arranged along the circumference of the mixer and in which the mixture is cooled. The drawn off gas is directed into an outer annular manifold and is then directed into a separator for further dust removal and, thereupon, into a $H_2S$ scrubber, while the slag particles which are solidified by quenching in the circulating waste gas from the ore reduction and fused to larger size agglomerates, drop into a slag separator designed as a water seal and are then removed through a slag lock.

The mixing of the gases and slag separation are particularly effective if the angle formed between the central hot gas nozzle and the circumferential hot gas nozzles ranges from 15 to 30 degrees. It is also advantageous to provide at least two circumferential hot gas nozzles and at least two gas outlets for the gas mixture and, preferably, four circumferential hot gas nozzles and four gas mixture outlets are provided.

Accordingly, it is an object of the invention to provide a method of producing reduction gases which consist essentially of carbon monoxide and hydrogen which comprises directing a coal and water suspension into a reactor to burn the suspension materials to generate combustion gases under pressure having a temperature in the range of from 1300° C. to 1500° C., mixing the combustion gases immediately after they are formed with reduction furnace waste gas having a temperature of from 100° C. to 500° C. to form cooler mixed gases, directing the mixed gases through a water seal separator to separate and quench slag particles therefrom and withdrawing the slag particles with water from the gas stream.

A further object of the invention is to provide a device for producing reduction gases consisting essentially of carbon monoxide and hydrogen which comprises a pressure gasification reactor having a burner for the burning of a coal and water suspension with oxygen to generate combustion gases under pressure and including a nozzle passage through which the gases are passed along with separate reduction furnace waste gases which are passed through nozzles surrounding the pressure gas nozzle into a gas mixing chamber, the gas mixing chamber comprising a slag separator having a water seal at the bottom into which the slag is separated and a discharge orifice leading to an annular discharge manifold which connects into a solid matter separator for the further removal of smaller particles from the gas stream and which also includes a liquid seal at the bottom thereof into which the particles are deflected by a baffle in the solid matter separator which includes a take off for the treated gases which are delivered to an ore-reducing plant.

Another object of the invention is to provide a device for producing reduction gases consisting essentially of carbon monoxide and hydrogen which is simple in design, rugged in construction and economical to manufacture.

For an understanding of the principles of the invention, reference is made to the following description of a typical embodiment thereof as illustrated in the accompanying drawing.

BRIEF DESCRIPTION OF THE DRAWING

The only FIGURE of the drawing is a schematic representation of an apparatus for producing reduction gases, constructed in accordance with the invention.

DESCRIPTION OF THE PREFERRED EMBODIMENT

Referring to the drawing in particular, the invention embodied therein, comprises, an improved apparatus for producing reduction gases consisting essentially of carbon monoxide and hydrogen in a single heat method and which includes a pressure gasification reactor 3 having double-walled construction and thermal insulation 5 therebetween and which includes a burner having a connection for a coal and water suspension and for oxygen which directs the combustion materials into the reaction chamber to generate reduction gases consisting essentially of carbon monoxide and hydrogen and which are maintained under a pressure.

The gases which are generated in reactor 3 are delivered through a central gas nozzle 6 and are admixed with reduction furnace waste gases delivered through an inlet nozzle 8 and an annular manifold 9 to individual mixing nozzles 10 which are directed inwardly for the combustion gases under pressure which are delivered to the central nozzle 6.

The gases are mixed in the gas mixer 7 and directed downwardly against a water seal having a water level 12 of a slag separator 11 formed at the lower end of the reactor.

An example of a generation of reduction gases in accordance with the method of the invention is as follows:

In order to produce 1000 metric tons per day of iron (41.6 t/h), 21.5 tons per hour of coal pulverized to a grain size below 400 microns and having a carbon content of 95% are suspended in water to produce a suspension having a solid matter content of 58.4% by weight. This suspension is supplied through a line 1 to a burner 2 of a pressure gasification reactor 3. 1600 $Nm^3$ per hour of 99.5% oxygen is admitted to burner 2 though a line 4. The coal is gasified in reactor 3 having a thermal insulation 5 under pressure of 6 bar and temperature of 1450° C. and 65,000 $Nm^3$ of gas are obtained with a content of 41,700 $Nm^3$ of carbon monoxide and hydrogen.

The gas is discharged from the pressure gasification reactor through a hot gas nozzle 6 into an underlying reservoir of water in a mixer 7 into which 69,500 $Nm^3$ per hour of circulating waste gas from the reduction furnace (not shown) having a temperature of 250° C. are blown through a supply line 8, an inner annular manifold 9 and hot gas nozzles 10. The liquefied or doughy slag particles contained in the hot gases coming from the pressure gasification reactor are quenched by contact with the admixed cooler circulating gas and agglomerate to larger particles which, due to their gravity, drop from the gas stream into the water seal of a slag separator 11, the water level of which is indicated at 12.

Depending on their size, the slag particles drop to the bottom of the water seal or remain suspended in the water. The slag particles sunk to the bottom are removed through a lock 13 with stopcocks 14 and 15, and a line 16. About 110 kg of slag per hour are removed. The slag particles, suspended in water, are drained along with the water of the water seal, in an amount of 15 $m^3$ per hour through a line 17 with a stopcock 18 into a solid/water separator 19 having a water level at 34.

The gas mixture has a temperature of 850° C. and passes through the obliquely upwardly extending outlets 20 provided on the periphery of mixer 7, the outer annular manifold 21 and line 22, into a solid matter separator 23 in which residual dust comprising approximately equal proportions of unconverted coal and ash is separated from the gas. The purified gas with a residual amount of dust of 1 g per $Nm^3$ leaves the plant through a line 24 and is fed to the ore reduction, for example, a shaft furnace, directly or through further purifying or washing plants (not shown), depending on the content of other impurities.

The dust separated on the baffle 25 of solid matter separator 23 drops into the water seal 26 of separator 23 having its water level at 27. Water and solid matter are discharged from there through a lock 28 with stopcocks 29 and 30, and a line 31 into the solid/water separator 19. The solid/water suspension from water seal 26 may also be discharged into the solid/water separator through a line 32 with a stopcock 33, bypassing lock 28.

The solid matter settles in separator 19 within about one hour and because of its high coal content of 33%, is removed from the conical bottom part in an amount of about 3000 kg per hour as an aqueous sludge having a solid matter content of 50% and is directed through a line 35 and pump 36 into the station for preparing the coal-water suspension (not shown). Water freed from solids passes into a trough 37 and is drawn off by pump 39 through a line 38 and is returned in an amount of about 5 $m^3$ per hour through line 40 into solid matter separator 23 and, in an amount of about 15 $m^3$ per hour, through line 41 into the overflow trough 42 of slag separator 11.

While a specific embodiment of the invention has been shown and described in detail to illustrate the application of the principles of the invention, it will be understood that the invention may be embodied otherwise without departing from such principles.

What is claimed is:

1. A single heat method of producing reduction gases consisting essentially of carbon monoxide and hydrogen for ore-reducing processes, comprising, burning a coal and water suspension with oxygen in a reactor to generate combustion gases under pressure having a temperature in the range of from 1300° C. to 1500° C., mixing the combustion gases immediately after they are formed with reduction furnace waste gases having a temperature of from 100° C. to 500° C. to form mixed gases having temperatures lower than the combustion gases, and to quench slag particles out of said combustion gases, directing said mixed gases through a solid matter to separate residual solid matter and to form purified mixed gases, scrubbing the purified mixed gases of $H_2S$, and directing said scrubbed, purified mixed gases to a reduction furnace.

2. A single heat method, as claimed in claim 1, wherein the combustion gases are mixed with the reduction furnace waste gases in a proportion of from 1:0.5 to 1:2.0

3. A single heat method, as claimed in claim 1, wherein the combustion gases and the waste gases from the reduction furnace are mixed in a proportion to provide a temperature of from 800° C. to 1000° C. for the mixed gases.

4. A single heat method, as claimed in claim 1, wherein the reduction furnace waste gases are first subjected to a deep dusting to remove the dust particles therefrom before they are mixed with the combustion gases.

5. A single heat method, as claimed in claim 1, wherein the combustion gases are formed at a pressure of between 5 and 10 bars.

6. A single heat method, as claimed in claim 1, wherein said combustion gases and reduction furnace waste gases are mixed over a reservoir of water whereby said quenched slag particles drop into said water, and further comprising the step of removing said slag particles with said water from the mixed gases.

7. A single heat method, as claimed in claim 6, wherein said combustion gases are mixed with said reducing furnace waste gases in a proportion between 1:0.5 to 1:20 to provide said mixed gases in a temperature range of 800° C. to 1000° C.

8. A single heat method, as claimed in claim 7, wherein said combustion gases are formed at a pressure ranging between 5 and 10 bar.

* * * * *